(12) United States Patent
Cho et al.

(10) Patent No.: US 7,003,583 B2
(45) Date of Patent: Feb. 21, 2006

(54) APPARATUS AND METHOD FOR PROCESSING STATUS INFORMATION

(75) Inventors: Mi Hwa Cho, Seoul (KR); Myung Rai Cho, Seongnam-shi (KR)

(73) Assignee: MagicEyes Digital Co., (KR)

( * ) Notice: Subject to any disclaimer, the term of this patent is extended or adjusted under 35 U.S.C. 154(b) by 784 days.

(21) Appl. No.: 09/894,574

(22) Filed: Jun. 28, 2001

(65) Prior Publication Data

US 2002/0120681 A1    Aug. 29, 2002

(30) Foreign Application Priority Data

Dec. 21, 2000   (KR)   ................................ 2000-79897

(51) Int. Cl.
*G06F 15/16* (2006.01)

(52) U.S. Cl. .................... 709/245; 709/219; 455/456.1; 707/203

(58) Field of Classification Search ................ 707/203; 709/223, 217, 245, 219; 455/456.5, 3, 456.1; 701/202; 340/531
See application file for complete search history.

(56) References Cited

U.S. PATENT DOCUMENTS

| | | | | |
|---|---|---|---|---|
| 5,930,474 A | * | 7/1999 | Dunworth et al. | .......... 709/217 |
| 6,023,223 A | * | 2/2000 | Baxter, Jr. | ................... 340/531 |
| 6,108,554 A | * | 8/2000 | Kawamoto | ............... 455/456.5 |
| 6,317,684 B1 | * | 11/2001 | Roeseler et al. | ............ 701/202 |
| 6,343,301 B1 | * | 1/2002 | Halt et al. | ................... 707/203 |
| 6,735,628 B1 | * | 5/2004 | Eyal | ........................... 709/223 |
| 2004/0058640 A1 | * | 3/2004 | Root et al. | ................. 455/3.01 |

* cited by examiner

*Primary Examiner*—John Follansbee
*Assistant Examiner*—Jungwon Chang
(74) *Attorney, Agent, or Firm*—Cantor Colburn LLP

(57) ABSTRACT

An apparatus and a method for processing status information are disclosed. At least one information of video data, audio data, and text data on an area and a theme is collected, the video data is combined with audio or text data based on colleted time of the video data, status information data to which information on a corresponding area and theme is added is generated to be transmitted to a web server, and temporal status information data on a desired theme and area transmitted from the web server is provided to an information user. Thus, information providers and information users can easily and quickly share desired real life status information, i.e., recent status information on a selected specific area and theme, so that they can easily produce and edit real life status information as if they processed information in news broadcasting and at the same time the value of corresponding information can be improved.

4 Claims, 12 Drawing Sheets

FIG. 6A

| AREA(51) | AREA CODE(52) |
|---|---|
| KANGNAM | 01 |
| SHINCHON | 02 |
| ABKUJEONG | 03 |
| CHAMSIL | 04 |
| HONGIK UNIVERSITY ENTRANCE | 05 |
| CHONGRO | 06 |
| MYUNGDONG | 07 |
| ... | ... |

FIG. 6B

| THEME(53) | THEME CODE(54) |
|---|---|
| TOUR | 01 |
| LIBRARY | 02 |
| CAFÉ | 03 |
| THEATER | 04 |
| SHOPPING | 05 |
| PERSON | 06 |
| EVENT | 07 |
| ... | ... |

APPARATUS AND METHOD FOR PROCESSING STATUS INFORMATION

BACKGROUND OF THE INVENTION

The present invention relates to a terminal device which transmits information to a web server through Internet and receives information provided from the web server, and more particularly, to a terminal device which collects status information generated in real life to transmit the status information to a web server in real time and receive the status information provided from the web server.

Recently, with increase of the number of portable terminal devices such as a cellular phone and the number of Internet users, various apparatuses and methods for providing information based on wire/wireless communication networks have been provided. In this respect, information collected by a record tool on a web, a phone, and a still camera has been conventionally provided to information users through a web site. Alternatively, information collected on on-line or off-line has been provided to information users through a web site after editing and processing steps.

The inserted tables in the following are comparison tables of conventional sites that provide information users with information.

|  | CNN.com | Selftv.com |
|---|---|---|
| Information user | User who enjoys news | User who desires to receive individual internet broadcasting |
| Types of information | News special channel | Making individual broadcasting Station |
| Information provider | 800 overseas collaborators, 24 international correspondent offices, CNN reporters of 37 branch offices | A number of unspecified persons having camcorder and USB camera, interested in private broadcasting |
| Information collecting method | After collecting news using camera and recorder by a small number of specified persons(reporters) draft news and transmit them through E-mail | After transmitting or recording present condition by private editing program, transmit present condition to editing program |
| Editing method | DG broadcasting equipment, editing system, live relay system | Editing tool mounted on PC(channel selection-recording-storing-file conversion-transmission) |
| Business types | Provide charged information related to advertisement and news | Install video terminal, rental fee, and sell contents |
| Contents style | Refined news of press | Individual documentary |
| Point | Wide network | Participation of a number of unspecified persons |

|  | Townews.com | Roadi.co.kr |
|---|---|---|
| Information user | User who desires to know area information | Driver and person concerned |
| Types of information | Area information close to real life | Real time traffic information |
| Information provider | Area information manager of a small number of specified persons | CC TV, taxi driver unspecified provider |
| Information collecting method | Directly and periodically enter writings on E-mail, notice board, morgue, or program by a small number of area residents | Provide screen to CC TV with oral by taxi driver and information provider using mobile terminal/handset |
| Editing method | Edit editing materials with digital editing equipment by specialist (web planner and web designer) and edit materials on web site by information provider | After processing materials, display materials in CC TV screen transmitting system and digital editing system |
| Business types | Advertisement order of area information manager and electronic transaction of area special product | ARS service, PDA service, and traffic information service on vehicle terminal |
| Contents style | Subdivision of existing contents such as geography, restaurant, and life information, in accordance with area | Refined information such as road and specialized traffic |
| Point | Subdivision of area information | Information of present condition |

Referring to the comparison tables, respective sites are constituted in such a manner that a small number of specified persons provide information with a limited theme, and a separate editing means for editing and processing information is required even in case of information obtained by a number of unspecified persons.

In other words, to open information and materials obtained by the public for a number of unspecified information users, it is necessary to edit the information using a separate editing program mounted on a personal computer (PC). Alternatively, it is necessary to request expert editing institutes such as Internet company, in which specialists edit information using an editing equipment, to edit corresponding information. In this case, separate expenses have been required.

Furthermore, even in case of news collected by a small number of specified persons such as news reporters not the public, the news are collected for a certain time period and then opened or transmitted to a number of information users at one time through a separate editing step. In this case, a problem arises in that the respective news cannot be provided in real time.

That is, after real-time information such as news flash or event accident is collected, edited and processed, the information is provided to information users using a means such as web or E-mail at one time. For this reason, the time needed for an information user to receive corresponding information increases.

As described above, the related art method for providing information has several problems. That is, a problem arises in that it is difficult to provide customers who desire to obtain information of various kinds more quickly with such information, due to limitation in collecting and editing information. For this reason, the information users had to obtain limited information only. This makes the information users difficult to timely obtain the information, thereby reducing the value of news or information. Moreover, no methods for easily opening various kinds of information obtained by a number of unspecified persons have been suggested.

SUMMARY OF THE INVENTION

Accordingly, the present invention is directed to a portable terminal device for processing status information that substantially obviates one or more of the problems due to limitations and disadvantages of the related art.

An object of the present invention is to provide to portable terminal device for processing status information in which after information such as video data, audio data, and text data is collected, the information is edited as status information data indicative of temporal status information on an area in which the information is collected and theme of the collected information and then transmitted to a web server in real time.

Another object of the present invention is to an apparatus for processing status information in which information such as video data, audio data, and text data collected by a separate collecting means is edited to be transmitted to a web server in real time.

Other object of the present invention is to a method for processing status information in which after information such as video data, audio data, and text data is collected, the information is edited and transmitted to a web server in real time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a portable terminal device for processing status information according to the present invention includes: a data collector for collecting video data, audio data, and text data on an arbitrary area and theme; a data combiner for combining the video data with at least one of the audio data and the text data and setting the generated temporal information of the combined data by the time at which the video data is collected; a data editor for adding code information on a theme and an area selected by a user to the video data collected by the data collector and the collected temporal information of the video data or the combined data generated by the data combiner so as to generate status information data indicative of temporal status information on an arbitrary area and theme; a data transmitter for transmitting the status information data to a web server; a data outputting unit for outputting the status information and indicating communication state between the portable terminal device and the web server; a user interface unit for inputting the user's external manipulation signal to generate the status information data; and a controller for controlling the operation of the data collector, the data combiner, the data editor, the data transmitter, and the data outputting unit in response to the users' manipulation signal input through the user interface unit.

In another aspect, an apparatus for processing status information according to the present invention includes: a portable terminal device for collecting at least one of video data, audio data, and text data on an arbitrary area and theme through a data collector, and outputting the collected data together with its temporal information; and a data processor for generating status information data indicative of temporal status information on an arbitrary area and theme based on the collected data from the portable terminal device and transmitting the generated status information data to a web server.

In other aspect, a method for processing status information according to the present invention includes the steps of: a) collecting at least one of video data, audio data, and text data on an arbitrary area and theme using a portable terminal device; b) combining the video data with at least one of the audio data and the text data and setting the generated temporal information of the combined data by the time at which the video data is collected; c) adding code information on a theme and area selected by a user to the video data collected in the step a) and the collected temporal information of the video data or the combined data generated in the step b) so as to generate status information data indicative of temporal status information on an arbitrary area and theme; and d) transmitting the status information data to a web server.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A and 6B are exemplary tables showing data structures that manage area and theme codes according to the embodiment of the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
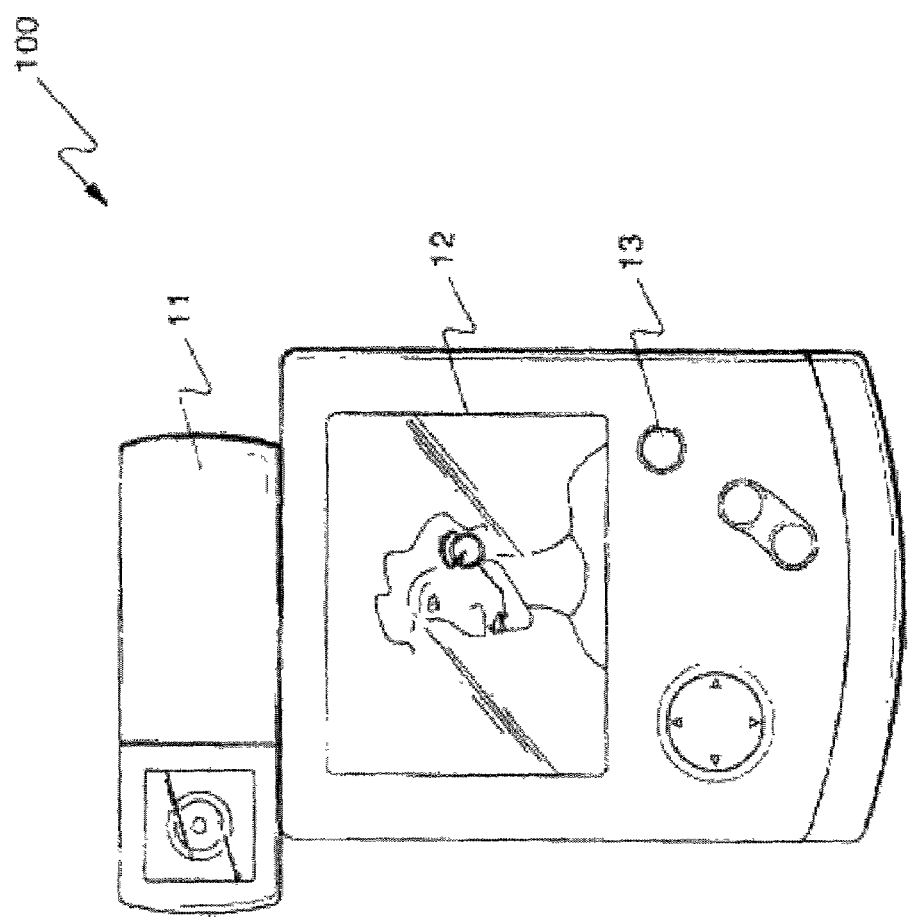
FIG. 1 shows a portable terminal device for processing status information according to one embodiment of the present invention.

FIG. 1 shows a portable terminal device for processing status information according to one embodiment of the present invention. Referring to FIG. 1, a portable terminal device 100 for processing status information according to the present invention includes a digital camera 11 for inputting a video signal, and a display unit 12 for outputting the video signal, and a keypad 13 for inputting an external manipulation signal.

The portable terminal device 100 collects or displays an arbitrary video as the digital camera 11 or the display unit 12 is operated by the keypad 13 being manipulated by a user.

Meanwhile, the portable terminal device 100 may further include a mike, a speaker, and a Universal Serial Bus (USB) port. That is to say, the portable terminal device 100 collects audio data using the mike, outputs audio data using the speaker, and performs data communication with a PC or a separate editor using the USB port.

Figure 2:
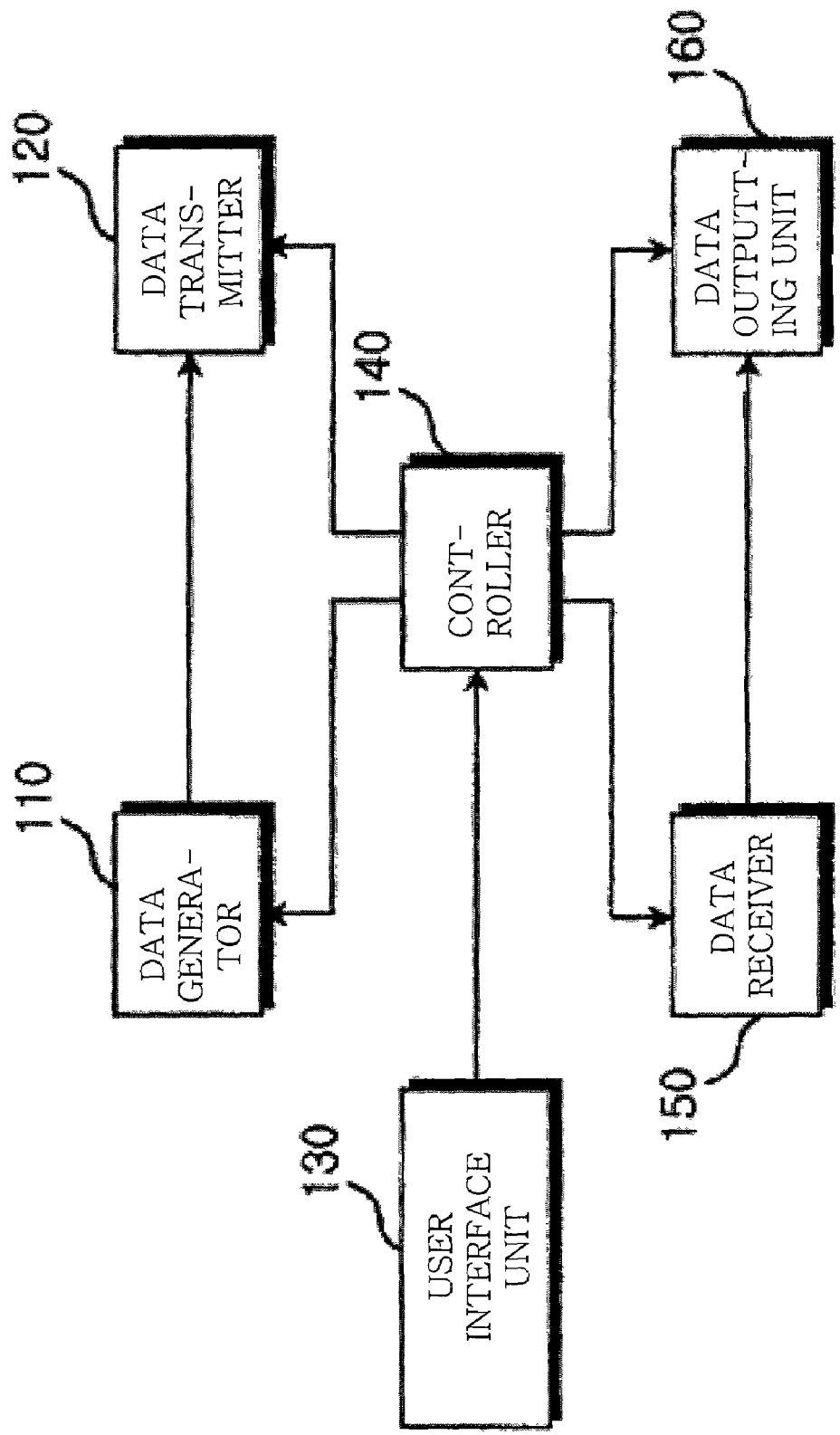
FIG. 2 is an internal block diagram showing a portable terminal device for processing status information according to one embodiment of the present invention.

FIG. 2 is an internal block diagram showing a portable terminal device for processing status information according to one embodiment of the present invention. Referring to FIG. 2, a portable terminal device 100 for processing status information according to one embodiment of the present invention includes a data generator 100, a data transmitter 120, a user interface unit 130, a controller 140, a data receiver 150, and a data outputting unit 160.

The data generator 110 collects at least one of video data, audio data, and text data on an arbitrary area and theme, and generates status information data indicative of temporal status information on a corresponding area and theme.

The data transmitter 120 transmits the status information data generated by the data generator 110 to a web server. At this time, the data transmitter 120 is connected with separate communication equipments such as cellular phones and PCs using a serial port or a USB port to transmit the status information data to the web server. Alternatively, the data transmitter 120 directly transmits the status information data to the web server through a wireless communication system. Also, when transmitting the status information data, the data transmitter 120 may transmit the status information data to which an identification number of the portable terminal device, current temporal information and user information are added, at the web server's request.

The user interface unit 130 inputs a user's external manipulation signal to generate the status information data.

The controller 140 controls the operation of the data generator 110, the data transmitter 120, the data receiver 150, and the data outputting unit 160 in response to the user's manipulation signal input through the user interface unit 130.

The data receiver 150 receives the status information data from the web server and outputs the same through the data outputting unit 160.

The data outputting unit 160 outputs the status information data received by the data receiver 150 and indicates communication state between the portable terminal device 100 and the web server. If the data receiver 150 receives the status information data, the data outputting unit 160 analyzes the received status information data and separates the video data, the audio data or the text data included in the status information data to respectively output them in accordance with types of the data.

Meanwhile, the status information data essentially should include its corresponding area and theme information. Area and theme codes corresponding to each area and theme may be managed by an internal memory of the unit for processing status information or may be transmitted from the web server when transmitting the status information data. In more detail, if the area code and the theme code are included in the internal memory, the data generator 110 generates the status information data in itself referring to the area code and the theme code stored in the internal memory. However, if the area code and the theme code are not included in the internal memory, the data generator 110 receives code information on an arbitrary theme and area transmitted from the web server through the data receiver 150 to generate the status information data.

Figure 3:
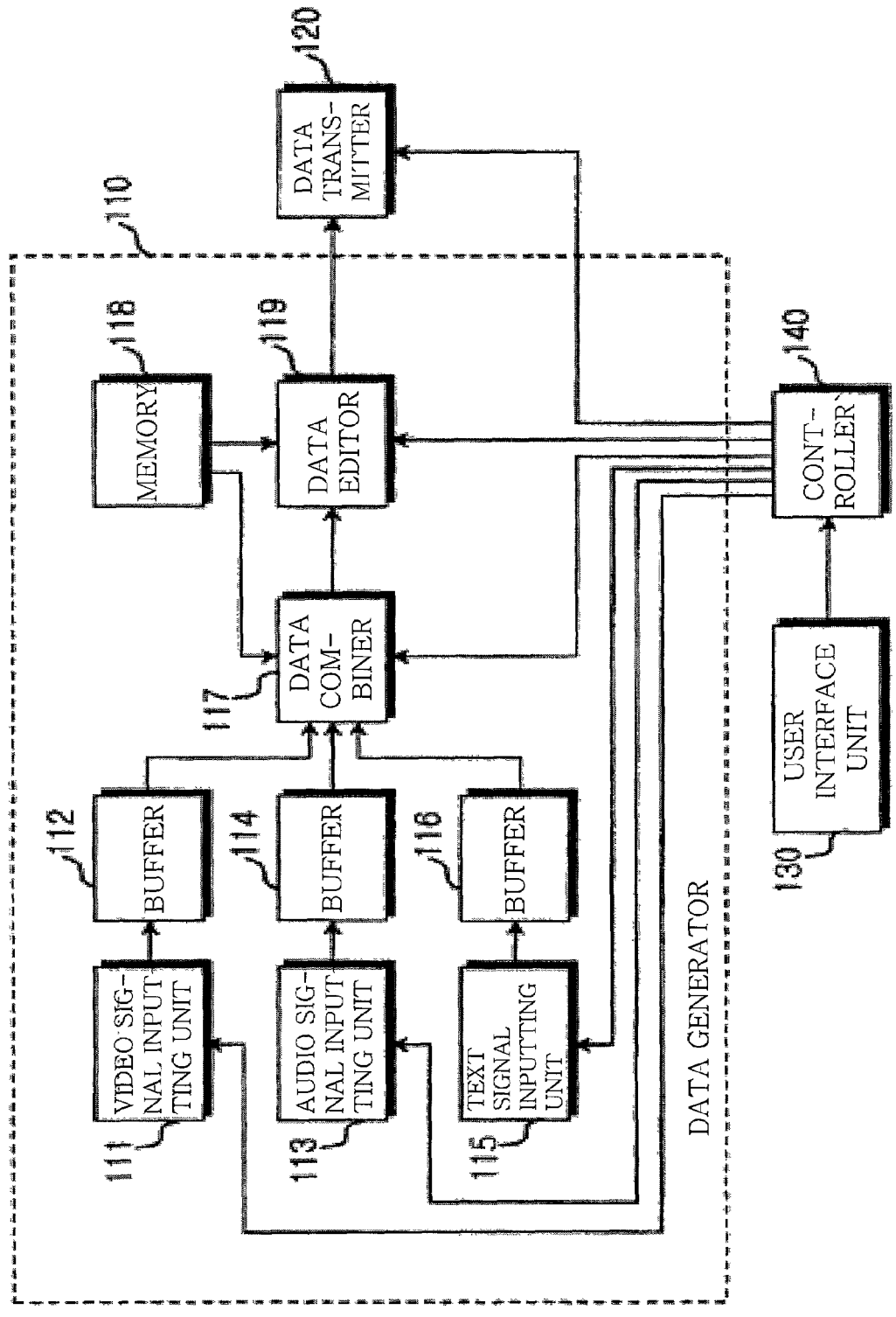
FIG. 3 is an internal block diagram showing a data generator according to one embodiment of the present invention.

FIG. 3 is an internal block diagram showing the data generator 110 according to one embodiment of the present invention. Referring to FIG. 3, the data generator 110 includes a video signal inputting unit 111, an audio signal inputting unit 113, a text signal inputting unit 115, buffers 112, 114 and 116, a data combiner 117, a memory 118, and a data editor 119. The video signal inputting unit 111, the audio signal inputting unit 113, and the text signal inputting unit 115 respectively collect video data, audio data or text data on an arbitrary area and theme under the control of the controller 140, and perform pre-processing of the respective data. Each of the buffers 112, 114 and 116 temporarily stores the respective data processed through the video signal inputting unit 111, the audio signal inputting unit 113, and the text signal inputting unit 115.

If the audio data and/or the text data are input to the data combiner 117 through the audio signal inputting unit 113 and/or the text signal inputting unit 115, the data combiner 117 combines the video data input through the video signal inputting unit 111 with the audio data and/or the text data, and outputs the combined data. At this time, the data combiner 117 sets generated time information of the combined data based on the time at which the video data is collected.

The memory 118 stores and manages an identification number of the unit for processing status information, theme and area codes, and its temporal information.

The data editor 119 adds theme and area codes selected by a user to input data to generate status information data indicative of temporal status information on an arbitrary area and theme. At this time, the data input to the data editor 119 is the video data and the collected temporal information data of the video data stored in the buffer 112 after being input by the video signal inputting unit 111, or the data combined by the data combiner 117.

Figure 4:
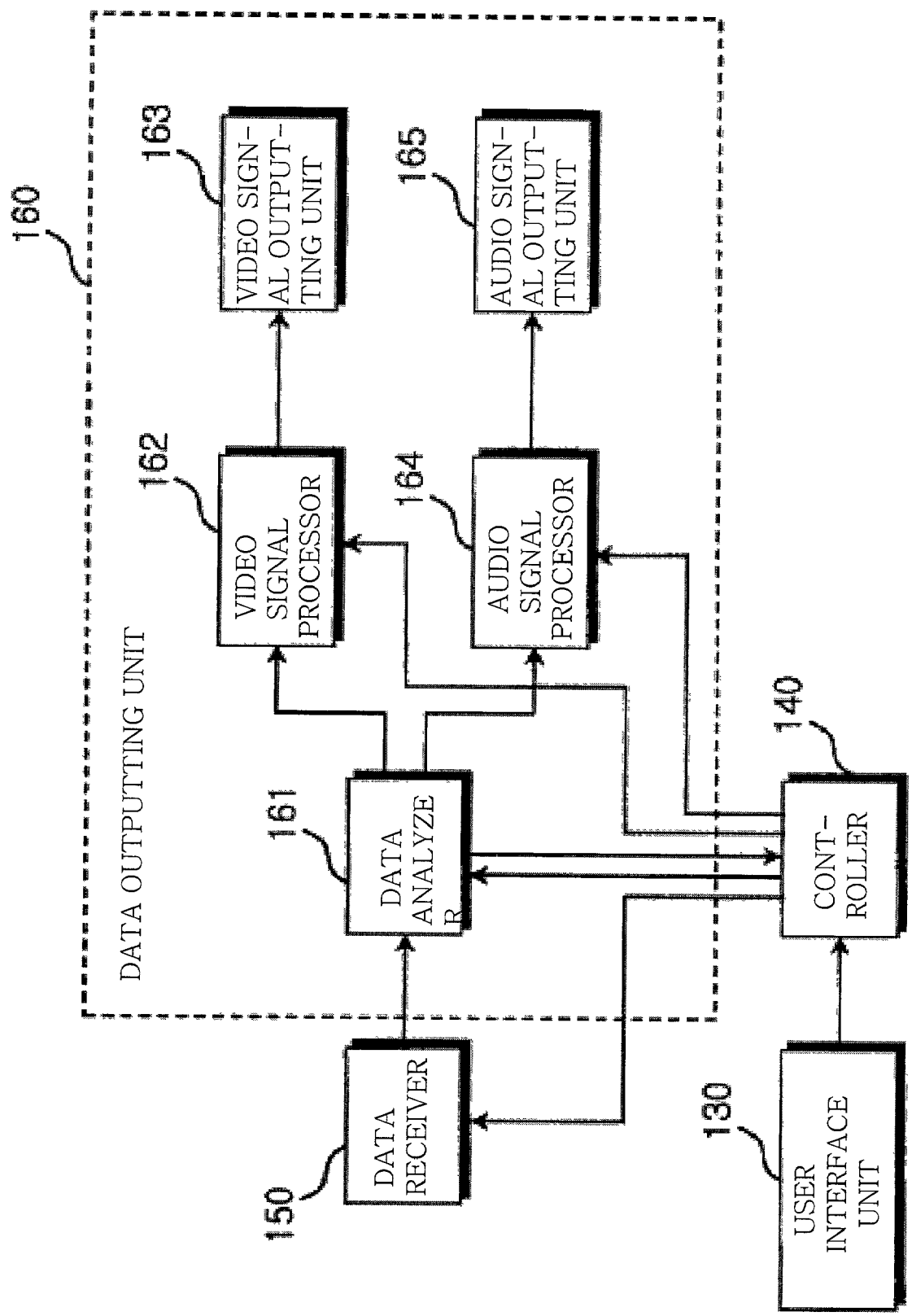
FIG. 4 is an internal block diagram showing a data outputting unit according to one embodiment of the present invention.

FIG. 4 is an internal block diagram showing the data outputting unit 160 according to one embodiment of the present invention. Referring to FIG. 4, the data outputting unit 160 includes a data analyzer 161, a video signal processor 162, a video signal outputting unit 163, an audio signal processor 164, and an audio signal outputting unit 165.

The data analyzer 161 analyzes the status information data transferred through the data receiver 150 to separate video data, audio data or text data included in the status information data from one another under the control of the controller 140.

The video signal processor 162 generates a video output signal of the video data and the text data separated by the data analyzer 161 and displays the same. The audio signal processor 164 generates an audio output signal of the audio data separated by the data analyzer 161.

Figure 5:
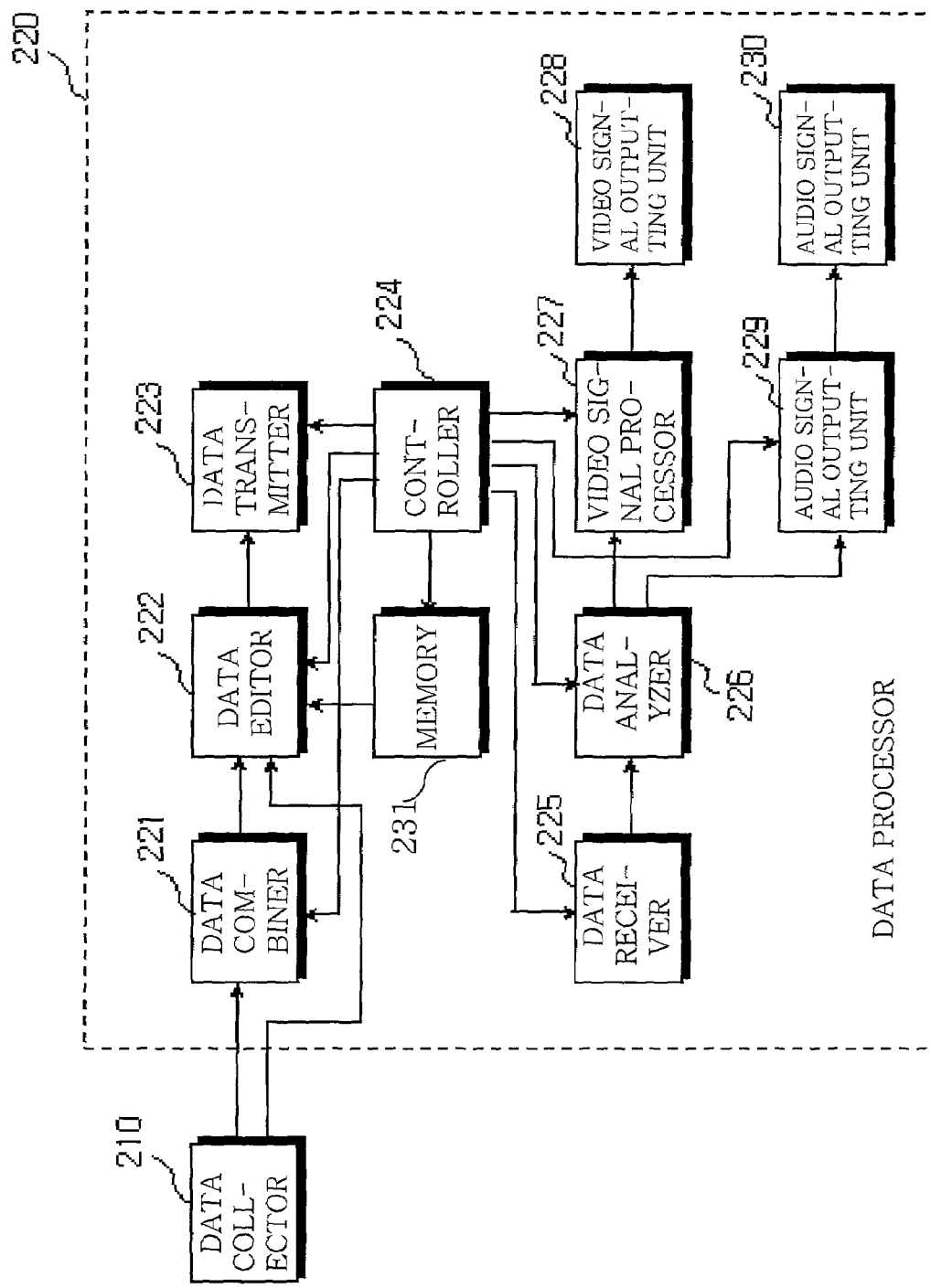
FIG. 5 is an internal block diagram showing an apparatus for processing status information according to another embodiment of the present invention.

FIG. 5 is an internal block diagram showing an apparatus for processing status information according to another embodiment of the present invention. Referring to FIG. 5, the apparatus for processing status information according to another embodiment of the present invention includes a data collector 210 for collecting at least one of video data, audio data, or text data on an arbitrary area and theme, and a data processor 220 for processing the data collected by the data collector 210.

The data collector 210 has a portable terminal type separated from the data processor 220.

The data processor 220 adds area information and theme information to either the video data collected by the data collector 210 or combined data obtained by combining the video data with the text data or the audio data, so as to generate status information data. Then, the data processor 220 transmits the generated status information data to the web server. At the request of an information user, the data processor 220 receives the status information data from the web server and provides a corresponding information user with the received status information data.

Furthermore, a PC that is provided with a program for processing corresponding data and can be connected with Internet may be used as the data processor 220. The data processor 220 includes a data combiner 221, a data editor 222, a data transmitter 223, a controller 224, a data receiver 225, a data analyzer 226, a video signal processor 227, a video signal outputting unit 228, an audio signal processor 229, an audio signal outputting unit 230, and a memory 231.

The data combiner 221 combines the video data with the data collected by the data collector 210. That is, the data combiner 221 outputs the combined data obtained by combining the video data with the audio data or the text data. At this time, generated time information of the combined data is set based on the time at which the video data is collected.

The data editor 222 adds area and theme codes selected by the user to the video data collected by the data collector 210 and the collected temporal information of the video data, or the combined data generated by the data combiner 221, so as to generate status information data indicative of temporal status information on an arbitrary area and theme.

The data transmitter 223 transmits the status information data to the web server.

If the status information data is transmitted from the web server to the data receiver 225 in response to a data request message input by a terminal user, the data receiver 225 receives the status information data. The data analyzer 226, the video signal processor 227, the audio signal outputting unit 228, the audio signal processor 229, and the audio signal outputting unit 230 respectively act in the same manner as the data analyzer 161, the audio signal processor 162, the audio signal outputting unit 163, the audio signal processor 164, and the audio signal outputting unit 165 shown in FIG. 4. Accordingly, their description will be omitted.

The memory 231 stores and manages an identification number of the apparatus for processing status information, theme and area codes, and its temporal information.

Meanwhile, the controller 224 outputs a control signal to respective elements of the data processor 220 to perform the above processing steps.

The area and theme codes of the status information data generated by the apparatus for processing status information of the present invention and stored/managed in the web server may be managed by the apparatus for processing status information or may be provided from the web server if necessary.

FIGS. 6A and 6B are exemplary tables showing data structures that manage area and theme codes according to the embodiment of the present invention.

To generate status information data, the data generator 110 for generating the status information data in accordance with the embodiment of the present invention adds corresponding area and theme information to the status information data based on area and theme codes sorted and stored as shown in FIGS. 6A and 6B.

For example, if arbitrary status information data is on a theater near Hongik University, '05' is recorded in an area information memory field of the status information data and '004' is recorded in its theme information memory field.

Figure 7:
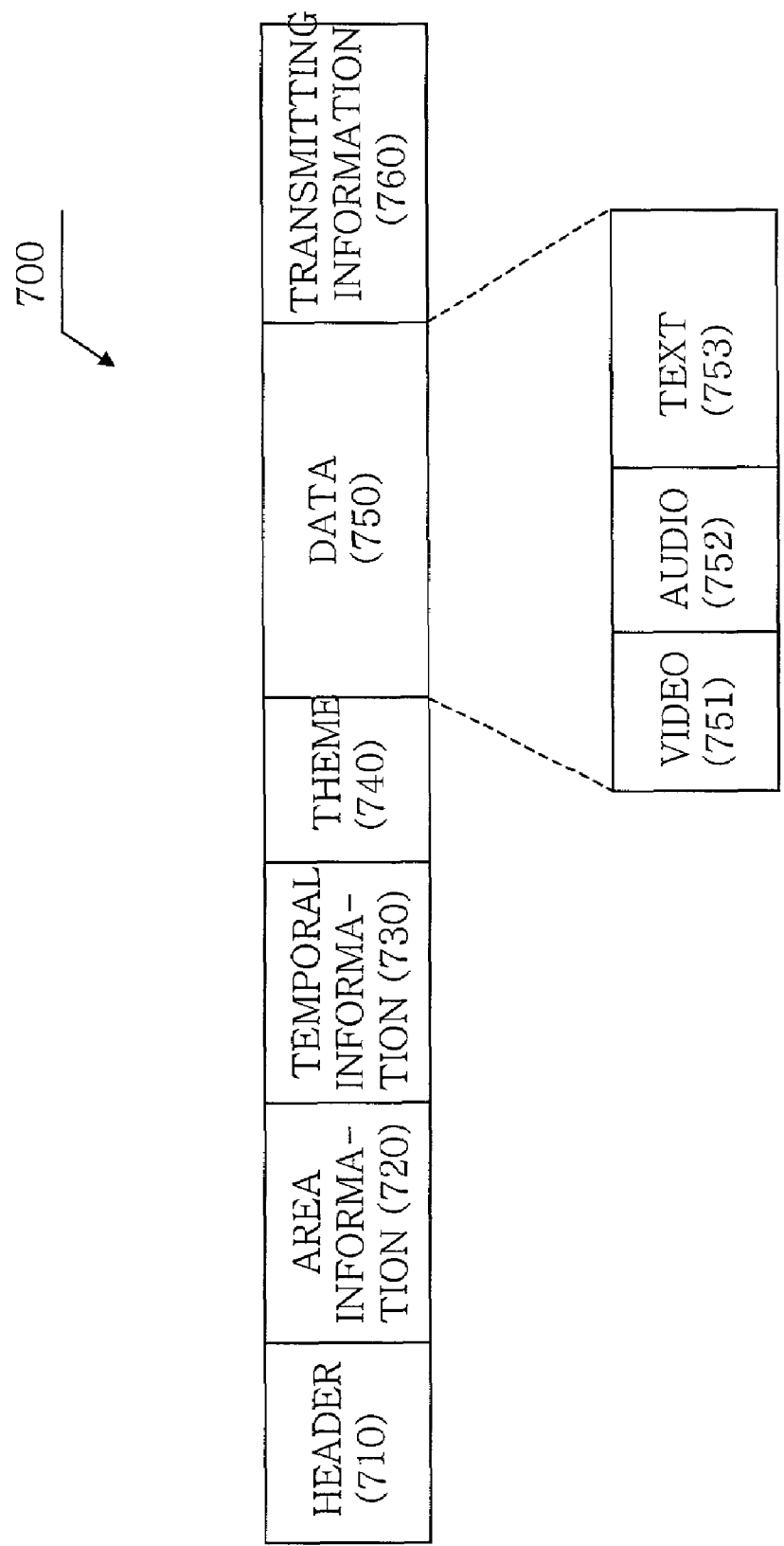
FIG. 7 is a schematic view of status information data generated in accordance with the embodiment of the present invention.

FIG. 7 is a schematic view of the status information data generated in accordance with the embodiment of the present invention. Referring to FIG. 7, data managed by the apparatus for processing status information in accordance with the present invention includes a header field 710 that is an identifier field of corresponding data, an area information field 720 indicative of area information corresponding to status information data, a temporal information field 730 indicative of temporal information when the status information data is generated, a theme field 740 indicative of a theme of the status information data, a data field 750 indicative of at least one combined data of video data, audio data and text data which are contents of the status information data, and a transmitting information field 760 indicative of information of an information provider which generates the status information data. At this time, the data field 750 is formed by combining one or more fields among a video data field 751 for video data, an audio data field 752 for audio data, and a text data field 753 for text data, with one another. The respective data fields have a variable length in accordance with the combining state.

At this time, the temporal information field 730 stores temporal information when the video data stored in a corresponding data field is generated.

Figure 8:
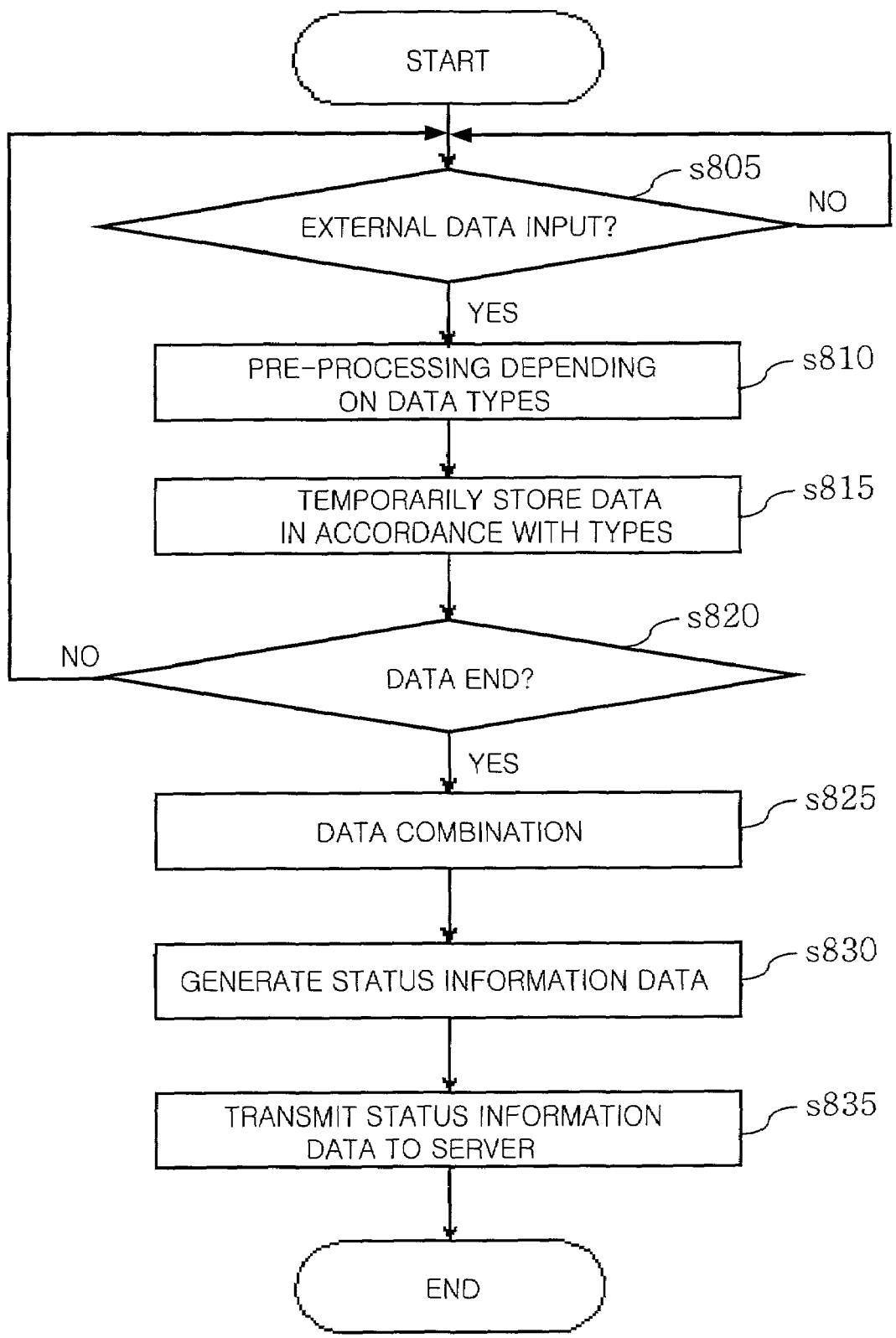
FIG. 8 is a flow chart showing a processing method for generating status information data in accordance with the embodiment of the present invention.

FIG. 8 is a flow chart showing a processing method for generating status information data in accordance with the embodiment of the present invention.

First, if at least one data among video data, audio data and text data is externally input by the data collecting step, pre-processing is performed in accordance with types of the data and the data is temporarily stored in accordance with type of the data in steps s805, s810, and s815.

If the data collecting step on a corresponding area and theme ends, either the video data or the combined data obtained by combining the video data with the audio data or the text data is output. Codes of the corresponding area and theme are added to the video data or the combined data to generate status information data on the area and theme in steps s820 to s830.

When the video data is combined with the audio data or the text data, generating time of the combined data is set at generating time of the video data.

Meanwhile, code information on the corresponding area and theme included in the status information data may be managed by an apparatus for processing status information or may be transmitted from a server which stores and manages the status information data, if necessary. That is, when transmitting the status information data, code information on the corresponding area and theme is transmitted from the server.

Figure 9:
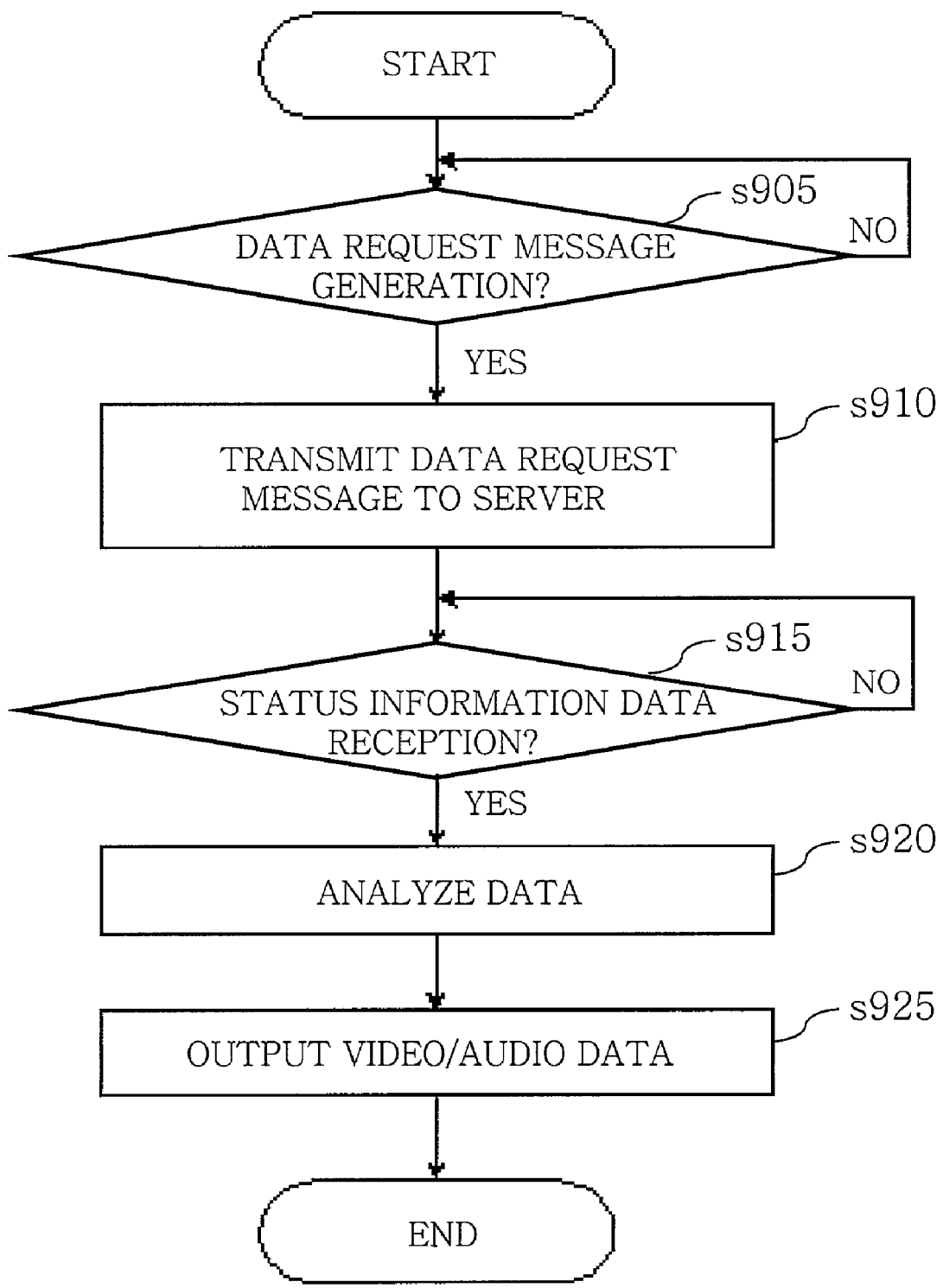
FIG. 9 is a flow chart showing a processing method for providing information users with status information data in accordance with the embodiment of the present invention.

FIG. 9 is a flow chart showing a processing method for providing information users with status information data in accordance with the embodiment of the present invention.

First, if a request message that desires to use status information data managed by an external server is input from an information user to the apparatus for processing status information in step s905, the apparatus for processing status information transmits the request message to the external server in step s910. If the apparatus for processing status information receives the status information data from the external server in response to the request message in step s915, the apparatus for processing status information analyzes the received status information data in step s920 and sorts video data, audio data, or text data in accordance with types of data included in the status information data to output the sorted data to the information user in step s925.

Figure 10:
FIG. 10 is an exemplary view showing web page screens for providing an information user with status information data in accordance with the embodiment of the present invention.

FIG. 10 is an exemplary view showing web page screens for providing an arbitrary information user with status information data in accordance with the embodiment of the present invention. Referring to FIG. 10, an example of a method for outputting arbitrary status information from the apparatus for processing status information of the present invention is shown.

As shown in FIG. 10, if an information user requests status information on a certain 'CAFÉ' within a certain area, the latest status information data on the café, such as cafe name, generating time of data, text data, and video data, is provided. At this time, if the audio data is included in the status information data, the audio data is output through a speaker.

Meanwhile, the information user can request previous or next status information data on the cafe using a 'PREVIOUS' or 'NEXT' button located on the bottom of the status information provided.

Figure 11:
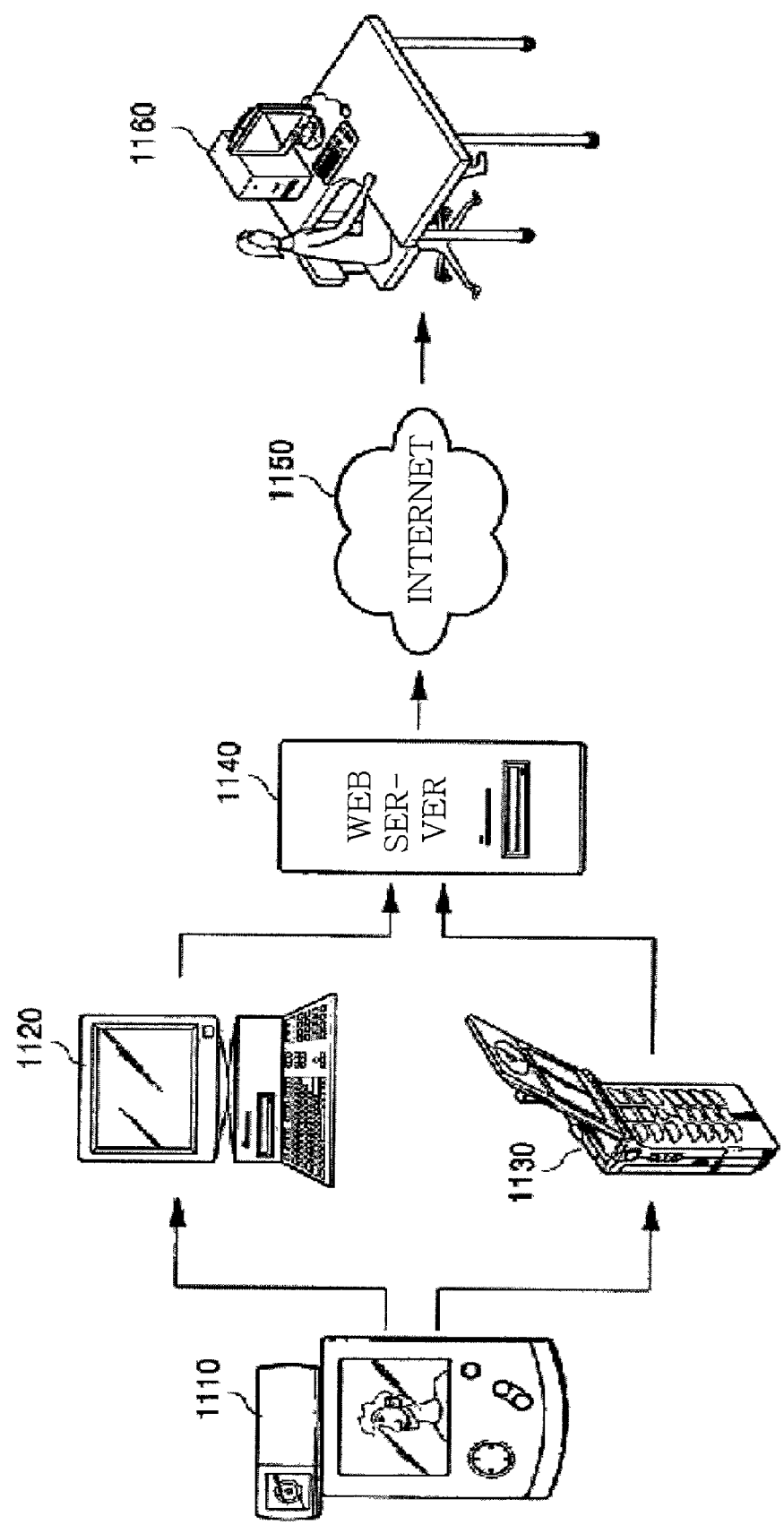
FIG. 11 is an exemplary view showing a real-time information managing system based on an apparatus of the present invention.

FIG. 11 is an exemplary view showing a real-time information managing system based on an apparatus of the present invention. Referring to FIG. 11, the real-time information managing system includes a portable terminal device 1110 which generates status information data on an arbitrary area and theme, a web server 1140 which stores and manages the status information data generated by the portable terminal device 1110, and a communication equipment (for example, a PC 1120 or a cellular phone 1130) which transmits the status information data generated by the portable terminal device 1110 to the web server 1140. At this time, a communication function provided by the PC 1120 or the cellular phone 1130 may be constituted by separate equipment or may incorporated into the portable terminal device 1110. The web server 1140 can provide information users, who use a portable terminal device 1110 or a separate terminal device 1160 connected to the Internet 1150, with corresponding data.

In more detail, after a number of unspecified persons generate status information data on a theme in an area where they are located, using a portable terminal device 1110, they transmit the status information data to the web server 1140 using a communication equipment such as the PC 1120 or the cellular phone 1130. The web server 1140 stores and manages the status information data. Also, if a number of unspecified persons request arbitrary data using the portable terminal device 1110 or the separate terminal device 1160 connected to the Internet 1150, the web server 1140 retrieves corresponding data to provide corresponding information users with them.

Figure 12:
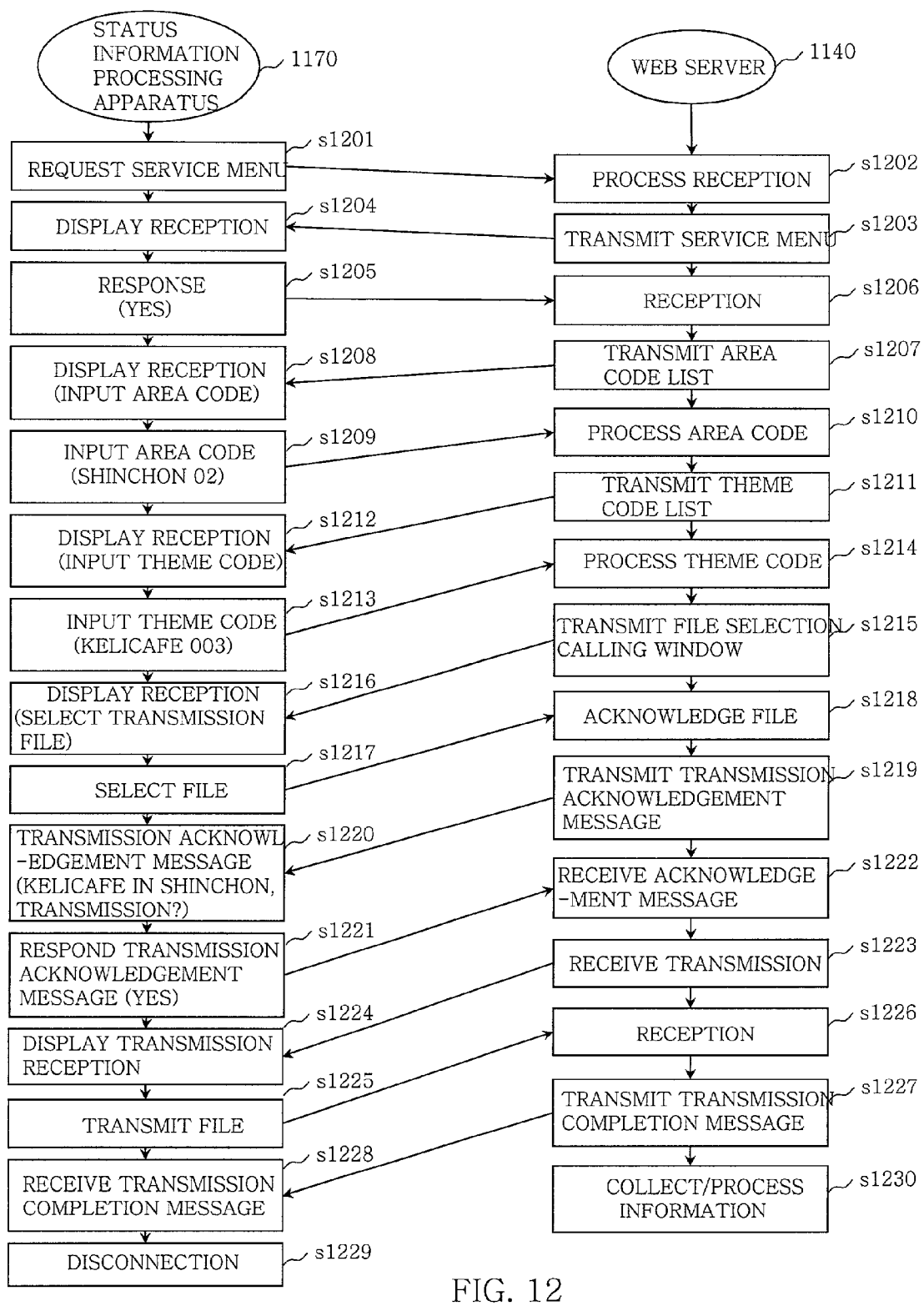
FIG. 12 is a flow chart showing a method for transmitting an information file from a portable terminal device to a server by the real-time information managing system of FIG. 11.

FIG. 12 is a flow chart showing a method for transmitting an information file from the status information processing apparatus 1170 (the portable terminal device for processing status information illustrated in FIG. 2 or the apparatus for processing status information illustrated in FIG. 5) to the web server 1140. Referring to FIG. 12, to transmit arbitrary status information data to the web server 1140 using the status information processing apparatus 1170, the status information processing apparatus 1170 transmits a service menu request message to the web server 1140 in step s1201. Then, the web server 940 receives the request message in step s1202 and transmits a service menu in response to the request message in step s1203.

After the status information processing apparatus 1170 receives the service menu, the status information processing apparatus 1170 displays contents of the received service menu in step s1204 and transmits a response message ('YES') in step s1205.

In accordance with the response message, the web server 1140 acknowledges that the status information processing apparatus 1170 has received the service menu, in step s1206. Then, the web server 1140 transmits an area code list containing code information on each area to the status information processing apparatus 1170 in step s1207.

The status information processing apparatus 1170 receives the area code list and displays it on a screen, so that an information message that instructs input of a desired area code ('INPUT AREA CODE') is displayed in step s1208. Then, the status information processing apparatus 1170 is on standby until the user inputs the area code. If the user inputs the area code, such as 'SHINCHON 02', the status information processing apparatus 1170 transmits the code information to the web server 1140 in step s1209.

After the web server 1140 processes the area code in step s1210, the web server 1140 transmits a theme code list containing code information on each theme to the status information processing apparatus 1170 in step s1211.

The status information processing apparatus 1170 receives the theme code list and displays it on the screen, so that an information message that instructs input of a desired theme code ('INPUT THEME CODE') is displayed in step s1212. Then, the status information processing apparatus 1170 is on standby until the user inputs the theme code. If the user inputs the theme code, such as 'KELI CAFE 003', the status information processing apparatus 1170 transmits the code information to the web server 1140 in step s1213.

After the web server 1140 processes the theme code in step s1214, the web server 1140 transmits an opening window for file selection to the status information processing apparatus 1170 to select a file containing information to be provided by the status information processing apparatus 1170 in step s1215.

After the status information processing apparatus 1170 receives the opening window and displays it on the screen in step s1216, the status information processing apparatus 1170 is on standby until the users selects a desired file. If the user selects a desired file, the status information processing apparatus 1170 transmits the selected file information to the web server 1140 in step s1217.

The web server 1140 acknowledges the file information selected by the status information processing apparatus 1170 in step s1218 and transmits a transmission acknowledgement message for a corresponding file in step s1219.

The status information processing apparatus 1170 receives the transmission acknowledgement message (for example, 'KELI CAFE IN SHINCHON, TRANSMISSION?') and displays it on the screen in step s1220. Then, the status information processing apparatus 1170 is on standby until the user responds to the message. If the user inputs 'YES' in response to the message, the status information processing apparatus 1170 transmits the response message 'YES' to the web server 1140 in step s1221.

After the web server 1140 receives the response message in step s1222, the web server 1140 transmits a transmission reception message to the status information processing apparatus 1170 in step s1223.

The status information processing apparatus 1170 displays the transmission reception message from the web server 1140 on the screen in step s1224 and transmits a corresponding file in step s1225.

The web server 1140 receives the file in step s1226. If transmission of the file is completed, the web server 1140 transmits a transmission completion message to the status information processing apparatus 1170 in step s1227, and collects and processes the received information in step s1230.

After the status information processing apparatus 1170 receives the transmission completion message in step s1228, the status information processing apparatus 1170 disconnects the web server 1140 in step s1229.

As aforementioned, the apparatus and method for processing status information has the following advantages.

Unlike the related art method for providing newspapers and broadcasting information through a separate editing step after collecting materials, status information data generated by simple editing step are directly provided to the web server with collecting separate materials, so that the time needed to provide services after collecting the materials can be reduced. Accordingly, the information users can timely use various and vivid news or information data at desired time, thereby improving the value of the news.

Furthermore, information of various kinds obtained in real life by a number of unspecified persons can easily be provided to a number of information users.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing status information comprising the steps of:
    a) collecting video data, audio data, and text data on an arbitrary area and theme using a portable terminal device;
    b) combining the video data with at least one of the audio data and the text data and setting generated temporal information of the combined data by a time at which the video data is collected;
    c) adding code information on a theme and area selected by a user to the video data collected in the step a) and the collected temporal information or the combined data generated in the step b) so as to generate status information data indicative of temporal status information on the arbitrary area and theme; and
    d) transmitting the status information data to a web server, wherein the status information data comprises:
    a status information field for adding area and theme codes to the video data or the combined data in which at least one of the audio data and the text data is combined with the video data, so as to indicate status information on the area theme;
    an area information field for indicating information on an area where the status information is generated;
    a temporal information field for indicating information on generating time of the status information; and
    a theme information field for indicating theme information of the status information.

2. The method of claim 1, wherein the step c) comprises referring to the code information on each theme and area, stored in a separate memory when generating the status information data.

3. The method of claim 1, wherein the step c) comprises using the code information on each theme and area provided from the web server when generating the status information data.

4. The method of claim 1, wherein the step d) comprises adding identification information of the portable terminal device, temporal information and user information to the status information data and transmitting a resultant status information data.

* * * * *